(12) United States Patent
Reeves

(10) Patent No.: US 7,966,755 B1
(45) Date of Patent: Jun. 28, 2011

(54) NAME BADGE AND COMPASS

(75) Inventor: John M. Reeves, Byfield, MA (US)

(73) Assignee: Reeves Company, Inc., Attleboro, MA (US)

( * ) Notice: Subject to any disclaimer, the term of this patent is extended or adjusted under 35 U.S.C. 154(b) by 238 days.

(21) Appl. No.: 12/432,062

(22) Filed: Apr. 29, 2009

(51) Int. Cl.
*A44C 3/00* (2006.01)
*A44C 13/00* (2006.01)
*A44C 1/00* (2006.01)
*G09F 3/18* (2006.01)
*G01C 9/02* (2006.01)
*G01C 9/00* (2006.01)
*G01C 17/00* (2006.01)
*G01C 17/08* (2006.01)
*A44B 1/04* (2006.01)
*A44B 9/10* (2006.01)

(52) U.S. Cl. .......... 40/1.5; 40/661.04; 63/1.11; 63/1.12; 63/20; 63/900; 33/347; 33/354; 33/355 R; 33/364; 24/303; 24/707.7

(58) Field of Classification Search .................. 40/1.5, 40/661.04; 33/347, 354, 355 R, 364; 63/1.11, 63/1.12, 20, 900; 24/303, 707.7
See application file for complete search history.

(56) References Cited

U.S. PATENT DOCUMENTS

| 1,614,228 | A | | 1/1927 | Breed |
| 1,961,067 | A | | 5/1934 | Mix |
| 2,433,185 | A | * | 12/1947 | Zinn ............................... 40/326 |
| 4,848,002 | A | | 7/1989 | Carmona et al. |
| 4,905,377 | A | | 3/1990 | Martinez et al. |
| 4,961,275 | A | * | 10/1990 | Klein ............................... 40/1.5 |
| 5,079,846 | A | | 1/1992 | Iden |
| 6,839,993 | B1 | | 1/2005 | Piche |
| 7,500,604 | B2 | | 3/2009 | Holme |
| 2002/0104224 | A1 | | 8/2002 | Barker |

OTHER PUBLICATIONS

Robertson, Scott, Webelos Compass Badge, lasted updated Sep. 17, 2008.

* cited by examiner

*Primary Examiner* — Joanne Silbermann
*Assistant Examiner* — Syed A Islam
(74) *Attorney, Agent, or Firm* — Salter & Michaelson

(57) ABSTRACT

A combination name badge and compass includes a substantially planar substrate having a front surface that has name indicia thereon, and a rear surface and a clutch bar that includes spaced pins. The clutch bar is secured to the rear surface of the planar substrate with the pins extending away from the planar substrate. A magnetic circuit includes a pair of opposite polarity magnets mounted at the substrate. The magnetic circuit further includes a metal arrow that is coupled with the opposite polarity magnets to form the magnetic circuit. When the name badge is floated on a liquid surface the metal indicator points to magnetic north.

7 Claims, 8 Drawing Sheets

NAME BADGE AND COMPASS

FIELD OF THE INVENTION

The present invention relates in general to an improved name badge. More particularly, the present invention relates to a combination name badge and compass.

BACKGROUND OF THE INVENTION

In the boy scouts, as well as in other endeavors, name badges are commonly used such as to indicate a person's name. In scouting these badges are also typically used for identifying a particular rank in scouting. Particularly in scouting, it is also common to have the scout use a needle-type compass to indicate direction. The compass is helpful in directing the scout through the woods and on trails.

It is an object of the present invention to provide a name badge that also functions as a compass.

SUMMARY OF THE INVENTION

To accomplish the foregoing and other objects, features and advantages of the present invention there is provided a name badge that is comprised of a substrate that is of generally rectangular shape and that includes a front surface that has name indicia thereon and a rear surface with an elongated pocket and oppositely disposed end holes and a clutch bar secured in the elongated pocket. The clutch bar includes a substantially flat bar piece and separately disposed pins extending from the bar piece and that are used for securing the name badge to a fabric. The name badge also includes a pair of opposite polarity magnets, one disposed in each of the substrate end holes and a metal arrow member with a pointed end. The metal arrow member includes through holes spaced the same distance as the spacing between the pins for receipt of the pins therethrough. The metal arrow member is secured over the clutch bar and pins and covers the opposite polarity magnets so as to provide a magnetic circuit with the magnets, whereby, when the name badge is floated on a liquid surface, the metal arrow member points to magnetic north.

In accordance with other aspects of the present invention the substrate may be a plastic material; the depth of the pocket is preferably substantially the same as the thickness of the flat bar piece; each of the magnets may be cylindrical in shape; the depth of each hole in the substrate may be substantially the same as a height of the magnet; the metal arrow member may comprise a steel arrow member.

In another embodiment of the present invention there is provided a combination name badge and geographically directional indicator that comprises a substantially planar substrate having a front surface that has name indicia thereon, and a rear surface; a clutch bar that includes pin means; means for securing the clutch member to the rear surface of the planar substrate with the pin means extending away from the planar substrate; and means defining a magnetic circuit including a pair of opposite polarity magnets mounted at the substrate. The magnetic circuit further includes a metal indicator that is coupled with the opposite polarity magnets to form the magnetic circuit. When the name badge is floated on a liquid surface the metal indicator points to magnetic north.

In accordance with other aspects of the present invention the substrate may be a plastic material; the rear surface of the planar substrate may have an elongated pocket for receiving the clutch bar; the clutch bar may include a substantially flat bar piece and separately disposed pins extending from the bar piece and that are used for securing the name badge to a fabric; the depth of the pocket may be substantially the same as the thickness of the flat bar piece; each of the magnets may be cylindrical in shape; the rear surface of the planar substrate may also have oppositely disposed end holes; the depth of each hole in the substrate is may be substantially the same as a height of the magnet; the metal indicator may comprise a metal arrow member; and the metal arrow member may comprise a steel arrow member.

In accordance with another embodiment of the present invention there is provided a name badge comprising a substantially planar substrate that includes a front surface that has name indicia thereon and a rear surface and a clutch bar secured to the rear surface of the planar substrate. The clutch bar includes a substantially flat bar piece and means for securing the name badge to a fabric. The name badge also includes a pair of opposite polarity magnets that are spacedly mounted to the planar substrate and a metal arrow member with a pointed end. The metal arrow member is secured over the clutch bar and covers the opposite polarity magnets so as to provide a magnetic circuit with the magnets, whereby, when the name badge is floated on a liquid surface, the metal arrow member points to magnetic north.

In accordance with still another aspects of the present invention the substrate may have an elongated pocket and oppositely disposed end holes, the pocket for receiving the flat bar piece of the clutch bar and the oppositely disposed end holes for receiving the magnets; the substantially flat bar piece may also have a pair of spacedly disposed pins extending therefrom; and the metal arrow member may have through holes spaced the same distance as the spacing between the pins for receipt of the pins therethrough.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

The badge construction of the present invention is particularly adapted for use in scouting, although, the use is not intended to be limited to only scouting. The name badge is worn in the normal manner on the clothing of the user. If the individual wearing the badge becomes lost, such as during a scouting expedition, he or she may pour water into an open-top container, and then may place the badge on the top surface of the water on which it floats. Because of the magnetic circuit that is comprised of a magnetic arrow member and spaced magnets, the badge floats in a circular path on the top of the water until the arrow points to magnetic north. In other words, when placed on the top surface of the water, the badge floats around until it points in the magnetic north direction, at which time it maintains this direction, thus helping a lost user to establish their direction. Thus, the badge construction disclosed herein essentially has the dual use as a name badge, as well as a compass.

Figure 1:
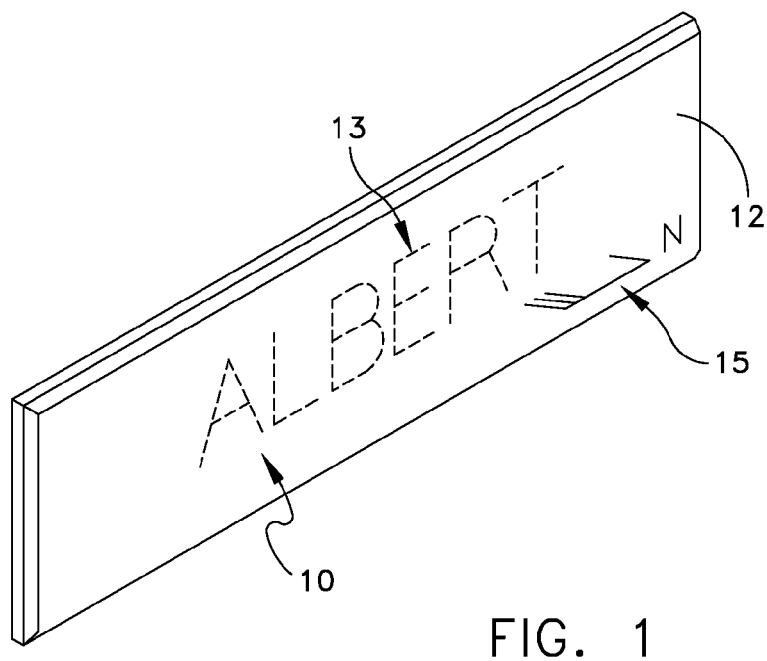
FIG. 1 is a front perspective view of the name badge of the present invention.
Figure 2:
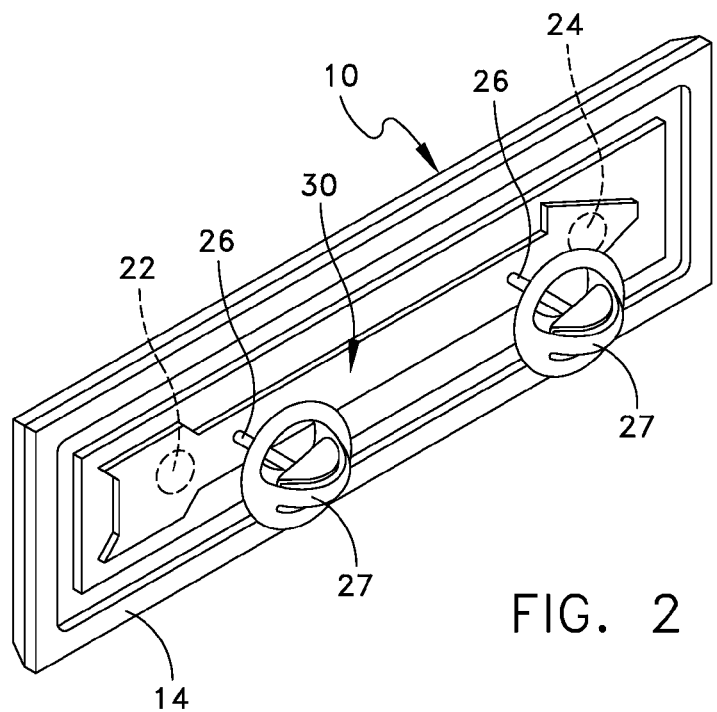
FIG. 2 is a rear perspective view of the badge of FIG. 1.

FIGS. 1 and 2 illustrate respective front and rear perspective views of the name badge constructed in accordance with the present invention. FIGS. 3-7 are further illustrations showing the manner in which the name badge is constructed. The main part of the badge is comprised of a substantially planar substrate 10 having a front side 12 and a rear side 14. As illustrated in FIG. 1, the front side has indicia as indicated at 13. This indicia may be the individual's name, an indication of rank, or virtually any other indicia. It is also noted in FIG. 1 that there is a symbol illustrated at 15 that corresponds in direction to magnetic north and furthermore corresponds in direction to the direction of the arrow member that is on the rear surface of the substrate. The substrate 10 may be constructed of a hard plastic material or any other type of magnetically insulating material.

Figure 3:
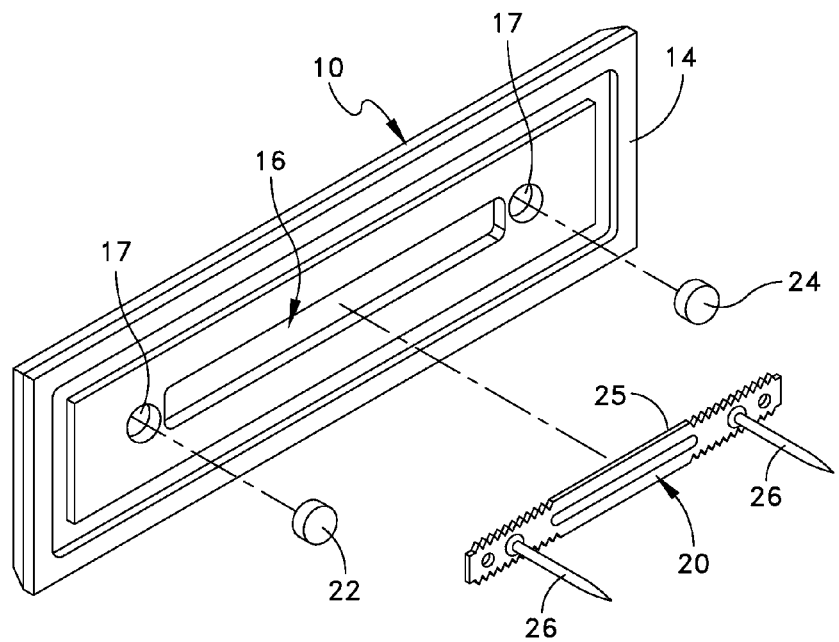
FIG. 3 is a rear perspective view of the badge with components exploded away.
Figure 4:
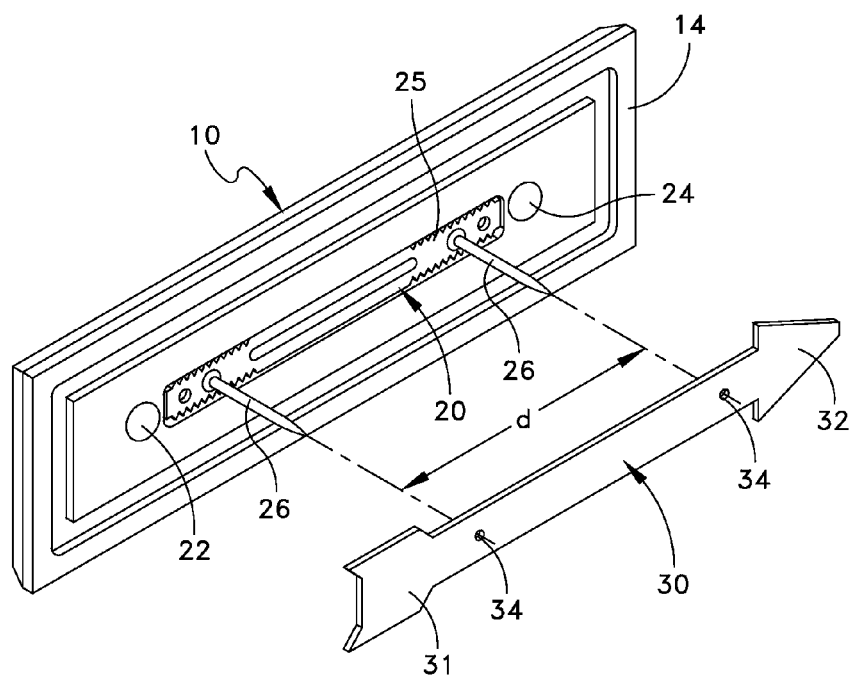
FIG. 4 is a rear perspective view of the badge also illustrating the magnetic circuit and arrow member.
Figure 5:
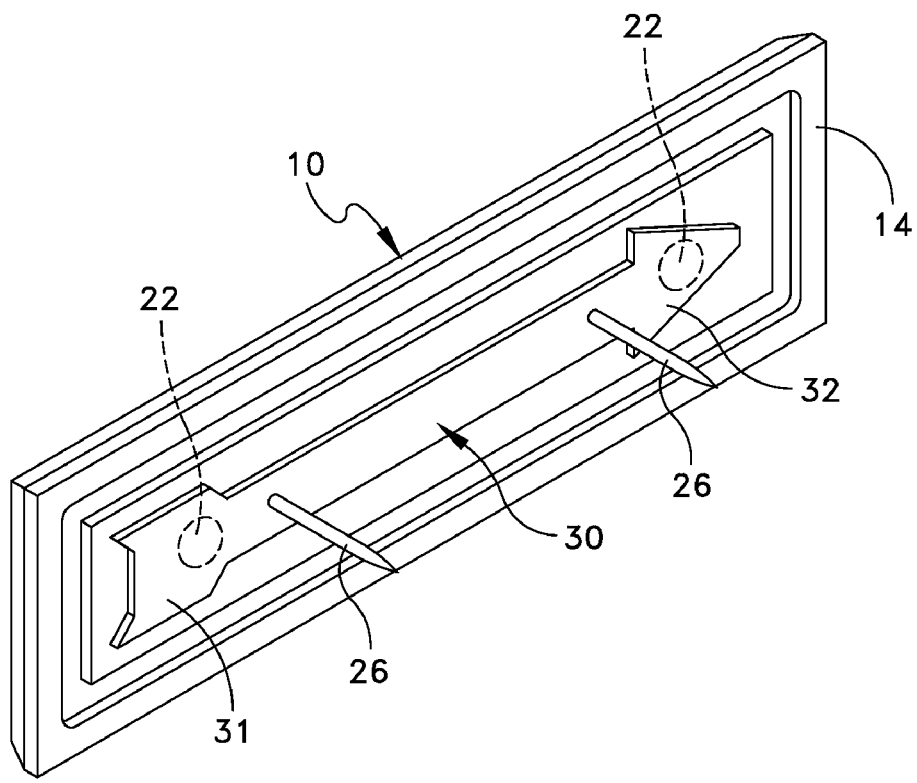
FIG. 5 is a rear perspective view of the badge once assembled.

The rear side 14 of the substrate 10 is illustrated in the rear perspective views of FIGS. 2-4 as a planar surface but one which is provided with certain indentations. These indentations may be formed by a milling process in a well known manner. These indentations include an elongated pocket 16 shown in FIG. 3 that extends longitudinally of the rectangular-shaped substrate. At either end of the elongated slot or pocket, there are provided oppositely disposed end holes 17. As noted in FIG. 3, these end holes are cylindrical in shape.

Referring once again to FIGS. 3 and 4, the badge structure also includes a clutch bar 20 and opposite polarity magnets 22 and 24. FIG. 3 illustrates the clutch bar 20 and magnets 22, 24 exploded away from the substrate 10. On the other hand, the perspective view of FIG. 4 illustrates the clutch bar 20 disposed in place within the elongated slot or pocket 16. FIG. 4 also illustrates the magnets 22 and 24 disposed in the accommodating holes 17 in the substrate 10. The clutch bar 20 includes an elongated bar piece 25 and spacedly disposed pins 26. The pins 26 are appropriately secured adjacent ends of the bar piece 25. As shown in FIG. 2 the pins are typically engaged by the clasps 27 to secure the badge to a fabric such as the user's shirt. The clutch bar 20 may be secured in the pocket 16 in a number of different ways such as with the use of an adhesive. Similarly, the magnets 22 and 24 may also be secured in the accommodating holes 17 in the substrate 10 in a well known manner such as with the use of an adhesive.

Figure 6:
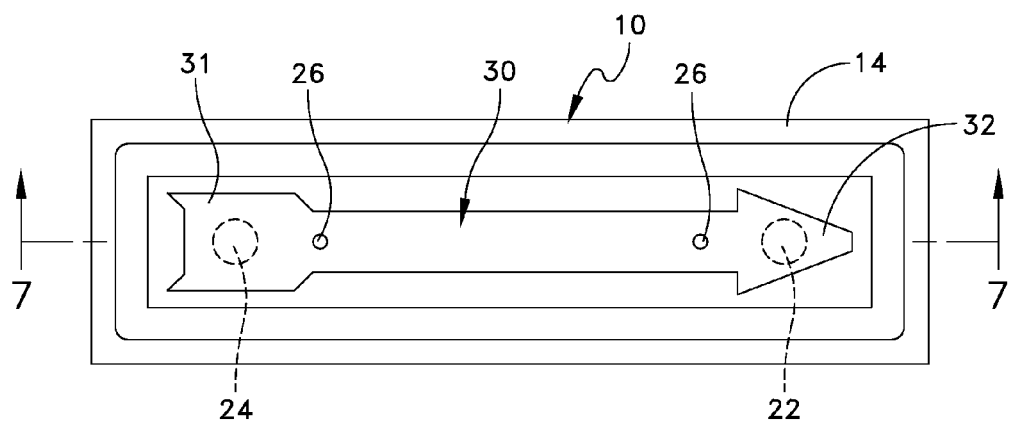
FIG. 6 is a rear view of the badge.
Figure 7:
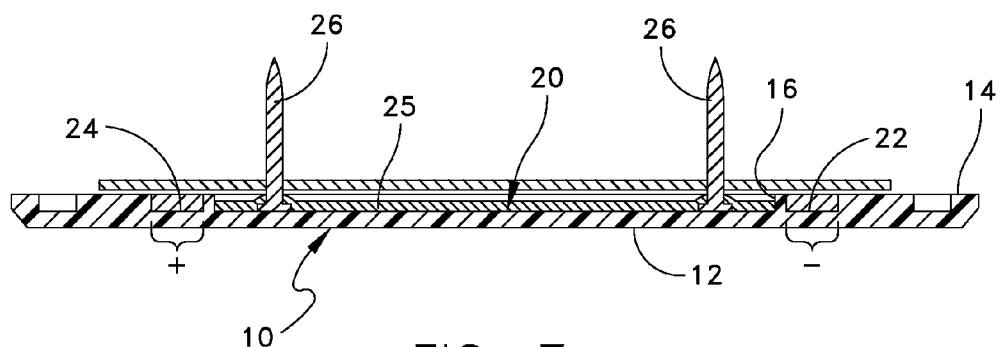
FIG. 7 is a cross-sectional view taken along line 7-7 of FIG. 6.

The badge construction also includes the metal arrow member 30 shown in an exploded position in FIG. 4. The arrow member 30 preferably comprises a flat steel arrow-shaped member having an arrow tail 31 and an arrow head 32. It is noted that the head 32 of the arrow points in the same direction as the indicia 15 on the front of the name badge. In that way one can observe direction from either side of the substrate. The arrow member 30 is also provided with a pair of holes 34 that are disposed apart by a distance "d" as noted in FIG. 4. This distance "d" also corresponds to the spacing between the pins 26 of the clutch bar 20. Thus, the next step in the assembly is to insert the arrow member 30 over the pins 26. It is noted that the tail end 31 of the arrow member 30 is in close proximity or contacts the magnet 22 when in position and the head end 32 of the arrow member 30 is in proximity to or close contact with the other magnet 24. This is also illustrated in FIGS. 6 and 7. In FIG. 6 the magnets 22 and 24 are shown in dotted outline and the magnets 22 and 24 are also shown in the cross-sectional view of FIG. 7. The magnetic circuit is formed between the arrow member 30 and the respective magnets 22 and 24. As indicated in FIG. 7, the magnets 22 and 24 are of opposite polarity so as to establish the proper magnetic circuit. The arrow member 30 may be attached to the substrate over the clutch bar and magnets in a number of different ways such as with the use of an adhesive.

Figure 8:
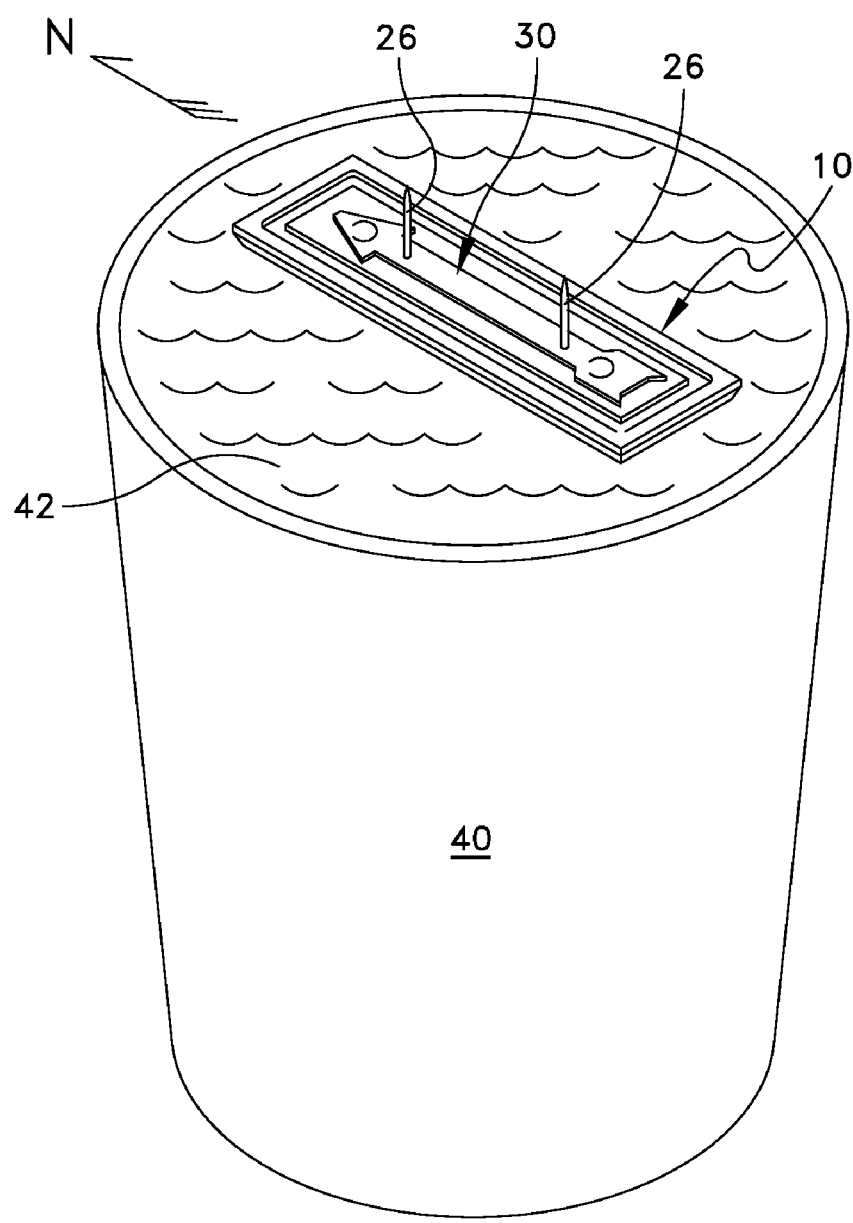
FIG. 8 is a perspective view illustrating the manner in which the name badge can be used as a compass when floated on water.
Figure 9:
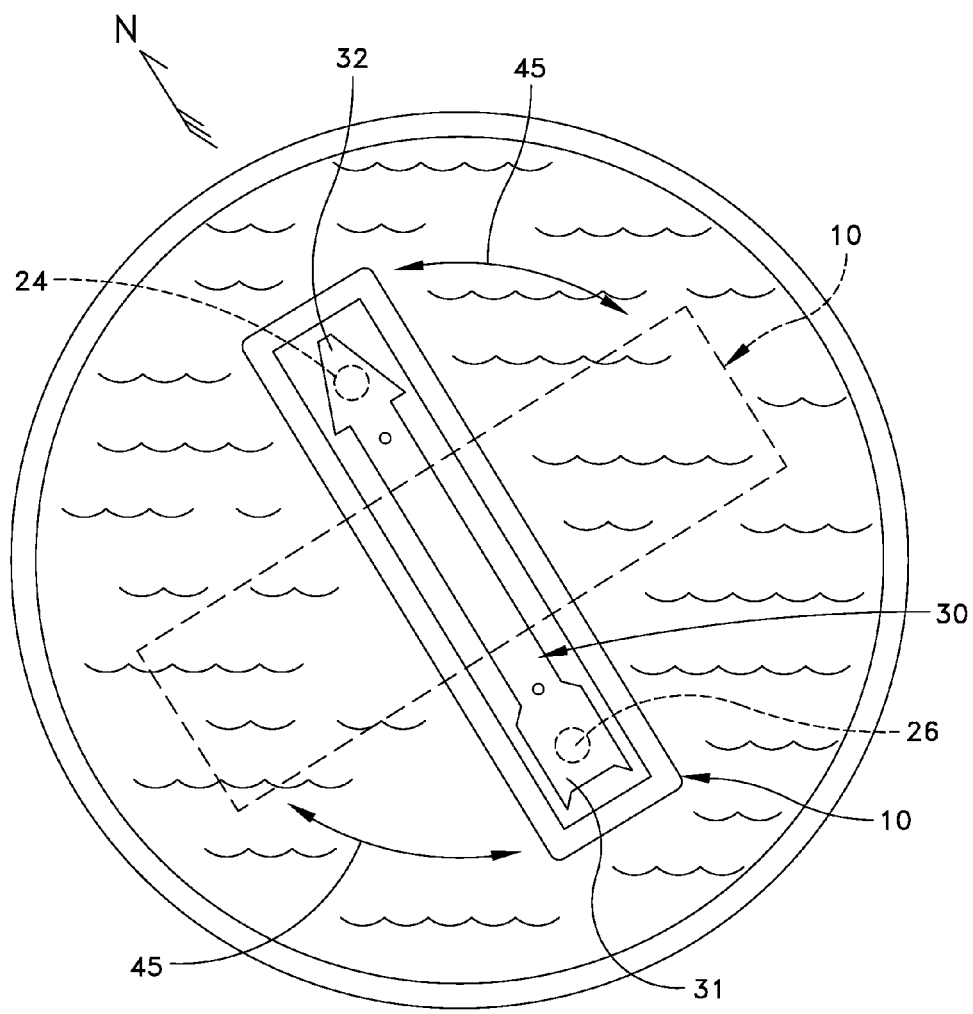
FIG. 9 is a top plan view of the name badge floating on water.
Figure 10:
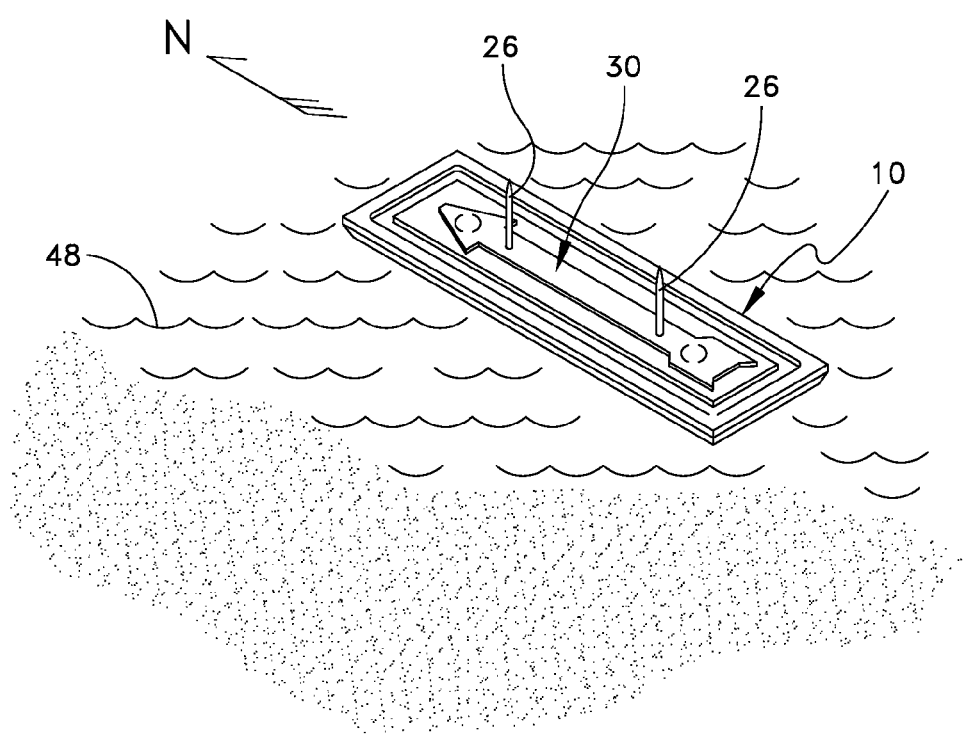
FIG. 10 is a perspective view illustrating the possibility of floating the badge on a pond or other water way.
Figure 11:
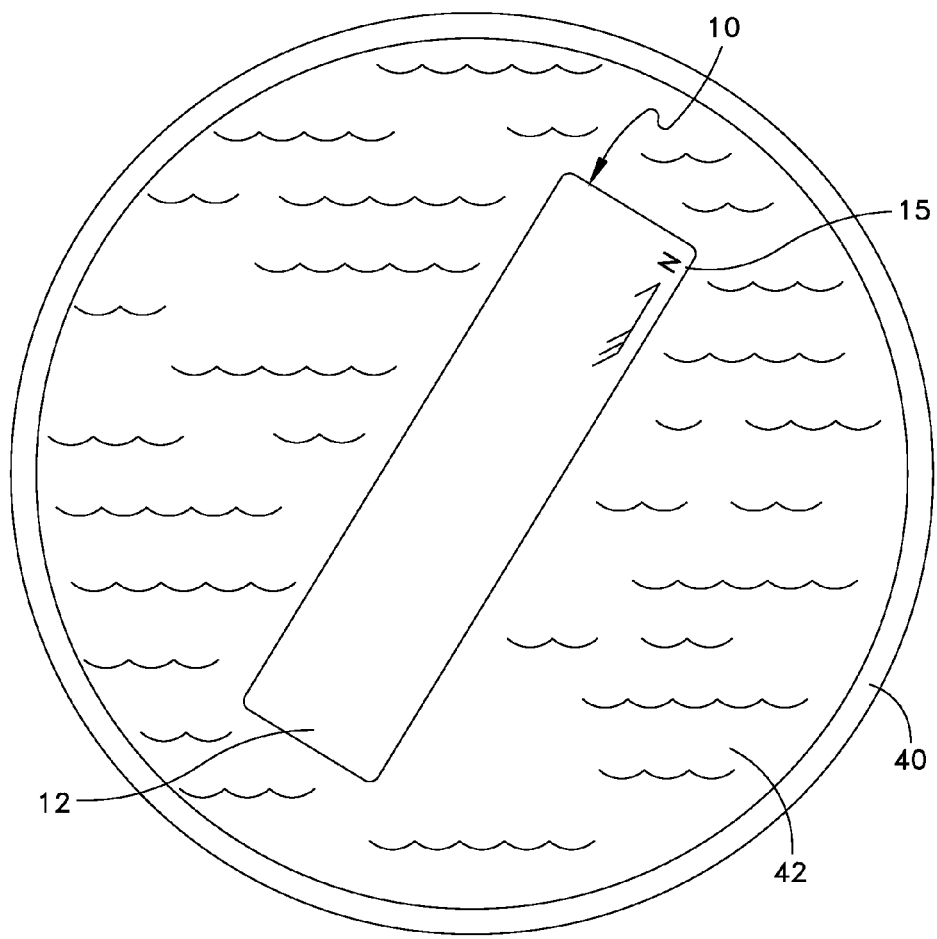
FIG. 11 is a top plan view of the name badge floated in an alternate position.

Because of the magnetic circuit, the badge will float in a circular path on top of a liquid surface such as on the top of water. Different scenarios are shown in FIGS. 8-11. FIG. 8 illustrates the name badge 10 floating on a liquid surface 42 of the open-top container 40. FIG. 8 illustrates the name badge 10 with its top side (name-baring) surface in a downward position on the top surface of the water. On the other hand, in FIG. 11 the badge has been placed with the top (name-baring) surface 12 upwardly positioned on the top surface of the water on which it floats. The position shown in FIG. 8 is preferred as there is less resistance to rotation of the substrate. For the arrangement of FIG. 8, reference may also be made to FIG. 9 which simply illustrates the rotation by the arrows 45. In dotted outline is disclosed perhaps an initial position of the badge and rotation occurs by way of arrows 45 to the position shown in solid in FIG. 9 where the arrow is pointing to magnetic north. The rotation occurs automatically from the magnetic attraction forces that are inherent when opposite polarity magnets are used. If a container is not available when one is lost, and there is access to any type of a water surface, this is illustrated in FIG. 10 by the water surface 48. FIG. 10 illustrates the name badge 10 floating on the water surface with the arrow 30 pointing to magnetic north. This surface, for example, may be the surface of a pond or lake.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A name badge comprising:
a substrate that is of generally rectangular shape and that includes a front surface that has name indicia thereon and a rear surface with oppositely disposed end holes; a clutch bar secured at the rear surface; said clutch bar including a substantially flat bar piece and separately disposed pins extending from the bar piece and that are used for securing the name badge to a fabric; a pair of opposite polarity magnets, one disposed in each of the substrate end holes; a metal arrow member with a pointed end; said metal arrow member including through holes spaced the same distance as the spacing between the pins for receipt of the pins therethrough; said metal arrow member secured over the clutch bar and pins and covering the opposite polarity magnets so as to provide a magnetic circuit with the magnets; whereby, when the name badge is floated on a liquid surface, the metal arrow member points to magnetic north.

2. The name badge of claim 1 wherein the substrate is a plastic material.

3. The name badge of claim 1 wherein a pocket is formed in the rear surface for receiving the clutch bar.

4. The name badge of claim 1 wherein each of the magnets is cylindrical in shape.

5. The name badge of claim 4 wherein the depth of each hole in the substrate is substantially the same as a height of the magnet.

6. The name badge of claim 1 wherein the metal arrow member comprises a steel arrow member.

7. A name badge comprising:
- a substantially planar substrate that includes a front surface that has name indicia thereon and a rear surface;
- a clutch bar secured to the rear surface of the planar substrate;
- said clutch bar including a substantially flat bar piece and means for securing the name badge to a fabric;
- a pair of opposite polarity magnets that are spacedly mounted to the planar substrate;
- a metal arrow member with a pointed end;
- said metal arrow member secured over the clutch bar and covering the opposite polarity magnets so as to provide a magnetic circuit with the magnets;
- wherein the rear surface of the planar substrate has oppositely disposed end holes for receiving the magnets;
- wherein the substantially flat bar piece also has a pair of spacedly disposed pins extending therefrom;
- and wherein the metal arrow member has through holes spaced the same distance as the spacing between the pins for receipt of the pins therethrough;
- whereby, when the name badge is floated on a liquid surface, the metal arrow member points to magnetic north.

* * * * *